Feb. 8, 1949.  J. W. REYNOLDS  2,460,946
HANGER
Filed July 17, 1946
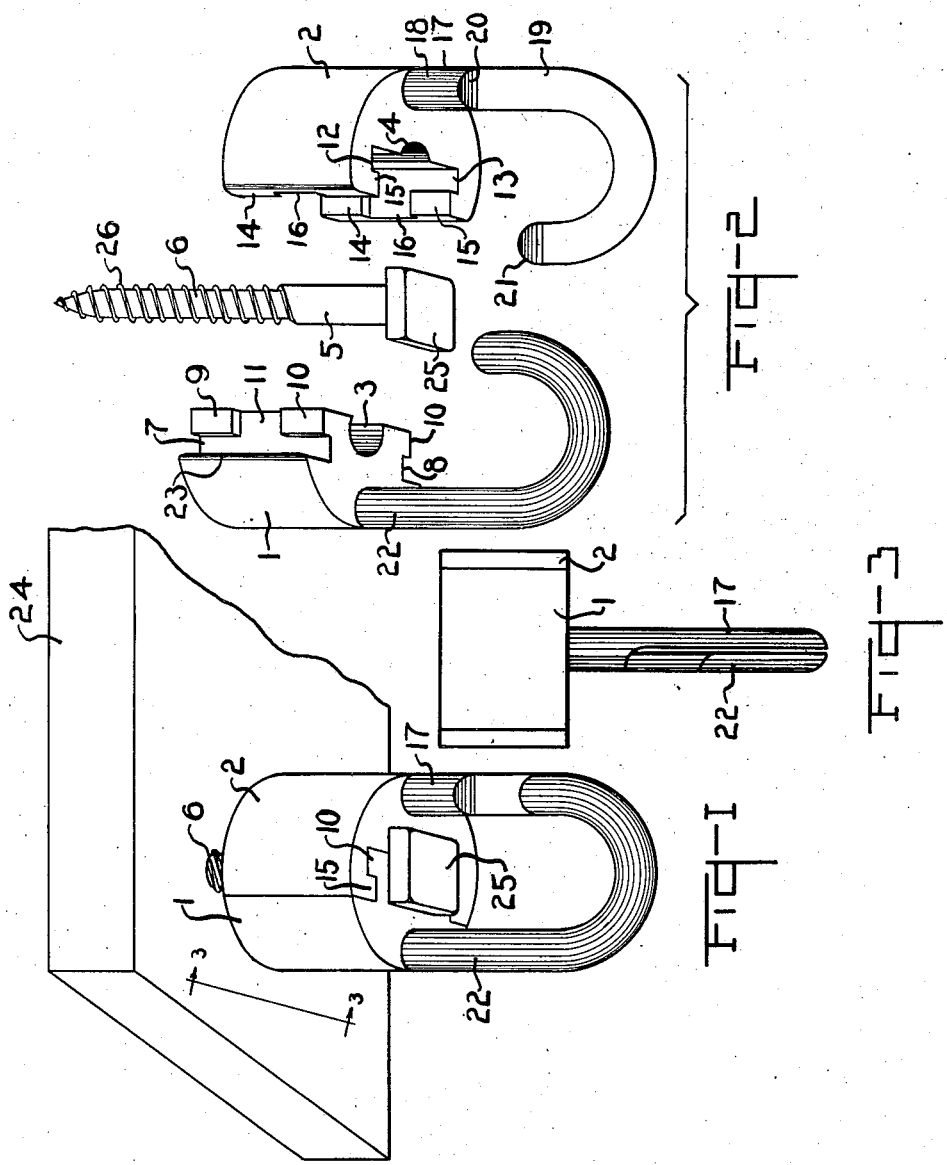
INVENTOR
John W. Reynolds
BY Roy A. Plant
ATTORNEY Patented Feb. 8, 1949

2,460,946

UNITED STATES PATENT OFFICE 2,460,946

HANGER

John W. Reynolds, Albion, Mich.

Application July 17, 1946, Serial No. 684,296

10 Claims. (Cl. 248—62)

1

The present invention relates broadly to hangers, and in its specific phases to a separable swivel hanger.

Eye bolts are exceptionally useful but of very limited adaptability since if the eye bolt shank is threaded like a lag screw it has to be screwed into place before use, and then whatever is to be supported by same threaded through the eye. If a piece of pipe is to be supported by an eye bolt of this type, the proper adjustment must be made before the pipe is threaded through the eye, since once the pipe is anchored in place, further adjustments are impossible. On the other hand if the eye bolt is threaded and supplied with a nut, then it must completely pass through a beam or other support so that the nut may be screwed onto the protruding end of the eye bolt to prevent the withdrawal of same when loaded. This type of construction requires complete dismantling when it is desired to remove same. With the latter construction, as well as with the lag screw type of eye bolt, if a pipe or the like has been threaded through the eye and it is desired to remove the eye bolt, then the pipe must be dismantled before the eye bolt can be removed. It was the shortcomings and difficulties encountered with the conventional eye bolts which lead to the discovery and development of the present invention.

Accordingly among the objects of the present invention is the provision of a swivel hanger which has a longitudinally divided separable body removably mounted on a bolt or lag screw which may be adjusted during use.

Another object is to provide a separable swivel hanger which has a body with male and female portions, each of which carry interlocking lugs.

Another object is to provide a separable swivel hanger having a pair of male and female body members, each of said body members carrying a J-shaped hook adapted to overlap the other to form a closed eye, and yet permit disassembly of the hanger.

A further object is to provide a separable swivel hanger which has a longitudinal bore through its body portion substantially centered on the separation plane and adapted to receive the shank of a bolt or lag screw and be adjustably supported by the head of same.

A further object is to provide a separable swivel hanger having male and female body portions with interengaging lugs, and a pair of J-shaped hooks forming a closed eye when the swivel hanger is assembled, said J-shaped hooks overlapping each other and being undercut to permit sufficient endwise movement of the male and

2 female body portions relative to each other to permit assembly and disassembly of the hanger through the engagement and disengagement of the interengaging lugs.

A further object is to provide a separable swivel hanger which permits the mounting of same on a suitable bolt or lag screw which has been previously mounted in desired position relative to the item to be supported by the hanger following which the separable swivel hanger may be mounted in place and the bolt or lag screw adjusted in required amount.

A further object is to provide a swivel hanger which may be used to support an item such as a pipe line, and which may be disassembled and removed without dismantling the pipe line.

A still further object is to provide a separable swivel hanger which may be carried like a tool for use and removal as conditions require.

Still further objects and advantages will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

Figure 1 shows a perspective view of a preferred form of the present invention installed ready for use.

Figure 2 shows in perspective view the elements of the Figure 1 assembly separated for ease of understanding the construction and operation of the assembly.

Figure 3 shows a side elevation taken from the left side of Figure 1 as viewed along line 3—3 looking in the direction of the arrows.

Referring more particularly to Figure 2 of the drawing it will be noted that the swivel hanger has two sub-assemblies, one of which includes male member 1, and the other the female member 2, the two being adapted to interlock as shown in Figure 1. The male member 1 has a longitudinal center opening 3, and the female member has a longitudinal center opening 4 such that when the male and female members 1 and 2 are assembled, as shown in Figure 1, openings 3 and 4 will form a center channel through which shank 5 of lag screw 6 is adapted to pass.

The male member 1 is provided with an outer pair of side channels 7 and 8 which are preferably parallel and opposite to each other as shown. Along side of channels 7 and 8 are a pair of projecting lugs 9 and 10 with a space 11 centrally located between them and preferably a little longer than either lug 9 or 10.

The female member has an inner pair of side channels 12 and 13. The width of these side channels is slightly greater than the width of projecting lugs 9 and 10, and the distance from the bottom of channel 12 to the bottom of channel 13 is slightly greater than the distance from the top face of lug 9 or 10 to the top face of the corresponding lug 9 or 10 on the opposite side of the male member 1. Adjacent channels 12 and 13 are a pair of inwardly projecting lugs 14 and 15. Between each pair of lugs 14 and 15 is a centrally located space 16 which is preferably slightly longer than either lug 9 or 10 for a purpose to be hereinafter described. The distance between a pair of lugs 15, or a pair of lugs 14, is slightly greater than the distance between side channels 7 and 8 of the male member 1.

Projecting from the end of female member 2 is a hook member 17, the shank 18 of which is preferably full size for strength and rigidity. At the end of the short shank 18, hook member 17 is cut away longitudinally so as to be semi-circular in section substantially to its free end. At the shank end of the semi-circular portion 19 is a concave portion 20 while the free end of semi-circular portion 19 has a convex curved area 21. In order to facilitate assembly the length of the hook member from the center of the hook to the free end 21 is shorter than the distance from the center of the hook to the concave portion 20 by an amount greater than the length of lugs 14 or 15. Hook member 22 on the male member 1 is of substantially the same size and shape as hook member 17 on the female member 2. These hook members 17 and 22, when assembled as shown in Figure 1, will lie adjacent to each other and form a closed eye portion.

The assembling of the male member 1 on the female member 2 is accomplished in the following manner:

Referring to Figure 2 it will be noted that the female member 2 is shown lower than the male member 1 to the extent of the length of lug 9 of the male member. With the male and female members in this position they are then moved directly toward each other with opposing lugs 14 of the female member 2 passing into and through opposing spaces 11 of the male member 1 until lugs 14 reach the back face 23 of side channels 7 and 8. In this position hook member 17 will overlap hook member 22 and will be displaced downward relative thereto a distance approximately equal to the length of lug 9. With the male and female members 1 and 2 in this position the male member may be slid downward until the hook ends of the male and female body members 1 and 2 are parallel to each other, and hook members 17 and 22 are side by side and form a closed eye. In this position lugs 9 and 10 of male member 1 will be in channels 12 and 13 behind lugs 14 and 15 of female member 2, thus forming an interlocked assembly. To disassemble the hanger, it is only necessary to reverse the steps just described.

Where something is to be hung on the swivel hanger, such as a pipe line (not shown), the J-shaped hook members 17 and 22 are hooked around it and then the male and female members are joined together around the lag screw 6, or the like, as described above, and the latter adjustably screwed into a supporting beam 24, as shown in Figure 1, with the head 25 of the lag screw supporting the lower end of the male and female members.

With a separable swivel hanger of this type, one or more of them may be carried in the worker's tool box so as to be available for use whenever needed. This assembly moreover is adjustable up and down to a limited extent depending on the length of lag screw 6 and the threads 26 thereon. If the use of the swivel hanger is temporary, then same may be disassembled and removed at the end of the job so as to be available the next time it is required.

Other modes of applying the principle of my invention may be employed instead of the one explained, change being made as regards the article and combination herein disclosed, provided the means stated by any of the following claims or the equivalent of such stated means be employed.

I therefore particularly point out and distinctly claim as my invention:

1. A hanger which has a body portion which is longitudinally divided full length substantially at its midpoint and provided with center grooves and interlocking means alongside said grooves, said interlocking means being engageable upon said body members being brought together while longitudinally offset relative to each other and lockable by then moving one of said body members longitudinally to assembled position.

2. A hanger which has a body portion longitudinally divided its full length into two main members having interengaging means on their adjacent faces which interlock when brought together and one moved longitudinally to assembled position, and cooperating hook means on each of said main members, said hooks having spaced apart elongated shanks extending substantially parallel to each other from the main members when the latter are assembled.

3. A hanger which comprises a body portion which is longitudinally divided its full length into male and female members, elongated shank hook means depending from said male and female members and cooperating with each other to form an elongated closed eye when the hanger is assembled, and means for fastening said male and female members together, said fastening means being engageable by moving said body members together while offset endwise a short distance relative to each other and then moving one of said members endwise to assembled position.

4. A hanger which comprises a body portion which is longitudinally divided its full length into male and female members, elongated shank hook means depending from said male and female members and cooperating with each other to form an elongated closed eye when the hanger is assembled, and interlocking lug and groove means on said male and female members for releasably locking same together, said interlocking lug and groove means being engageable for locking by moving said male and female members together while offset endwise a short distance relative to each other, and then moving one of said members endwise to assembled position.

5. A swivel hanger adapted to be mounted on a lag screw or the like which may extend from a suitable support, which comprises a body member with a longitudinal opening therethrough to receive the shank of said lag screw, said body member being longitudinally divided full length into two main members substantially at a plane through the center of said longitudinal opening, and separate long shank hook means projecting from the same end of each of said main members of the body, said hook means projecting toward each other in manner cooperating to form an elongated closed eye with the free end of said hook means lying overlapped in side by side position when the hanger is assembled.

6. A swivel hanger adapted to be mounted on a lag screw or the like which may extend from a suitable support, which comprises a body member with a longitudinal opening therethrough to receive the shank of said lag screw, said body being longitudinally divided full length into two main members substantially at a plane through the center of said longitudinal opening, means for releasably fastening together said main members of the body when same are brought into engagement and one of said members moved endwise to assembled position, and separate long shank hook means with inturned hooks projecting from the same end of each of said main members of the body, the shanks of said hook means being substantially parallel and cooperating with the inturned hook end of each other to form an elongated closed eye with the free end of said hooks lying overlapped in side by side position when the hanger is assembled.

7. A swivel hanger adapted to be mounted on a lag screw or the like which may extend from a suitable support, which comprises a body member with a longitudinal opening therethrough to receive the shank of said lag screw, said body being longitudinally divided full length into two main members of approximately the same length, said division being substantially at a plane through the center of said longitudinal opening, interlocking lug and groove means on both of said main members of the body for releasably fastening them together when brought into engagement and one main member moved endwise into assembled position, and separate long shank hook means with inturned hooks projecting from the same end of each of said main members of the body, the shanks of said hook means being substantially parallel and cooperating with the inturned hook end of each other to form an elongated closed eye with the free end of said hooks lying in overlapped side by side position when the hanger is assembled.

8. A swivel hanger adapted to be mounted on a lag screw or the like which may extend from a suitable support, which comprises a body member with a longitudinal opening therethrough to receive the shank of said lag screw, said body member being longitudinally divided substantially at a plane through the center of said longitudinal opening into male and female portions of substantially the same length, interlocking lug and groove means on both of said male and female members for releasably joining them together, said lugs extending longitudinally of said body members and being engageable by direct movement of said male and female portions toward each other while longitudinally offset a short distance relative to each other, followed by longitudinal movement of one of the members to assembled position, and separate elongated J-shaped hook means extending from the same end of each of said male and female members, said hook means having its hook ends lying side by side and cooperating with each other to form an elongated closed eye when the hanger is assembled.

9. A hanger which has a body portion which is longitudinally divided full length substantially at its midpoint to form male and female members and provided with a matching longitudinal center groove in each member, said male member having a pair of spaced apart outwardly projecting lugs on each side, and said female member having a pair of spaced apart inwardly projecting lugs on each side, said lugs on the male and female members being of a size and location permitting meshing upon moving same together and then locking by moving one of said members endwise to assembled position.

10. A hanger which has a body portion which is longitudinally divided full length substantially at its midpoint to form male and female members and provided with a matching longitudinal center groove in each member, an elongated shank substantially J-shaped hook member depending from each of said male and female members, said hook members being flattened on adjacent sides so as to cooperate with each other, said flattening extending up said shank a substantial distance above the point of the adjacent hook to facilitate assembly, said male member having a pair of spaced apart outwardly projecting lugs on each side, and said female member having a pair of spaced apart inwardly projecting lugs on each side, said lugs on the male and female members being of a size and location permitting meshing upon moving same together and then locking by moving one of said members endwise to assembled position with said hooks in parallel overlapping position.

JOHN W. REYNOLDS.

REFERENCES CITED

The following references are of record in the file of this patent:

UNITED STATES PATENTS

| Number | Name | Date |
|---|---|---|
| 229,738 | Mount | July 6, 1880 |
| 344,483 | Kelly | June 29, 1886 |
| 867,760 | Schang | Oct. 8, 1907 |